(12) United States Patent
Lu et al.

(10) Patent No.: US 12,387,194 B2
(45) Date of Patent: Aug. 12, 2025

(54) PAYMENT METHOD, APPARATUS AND SYSTEM, DEVICE, AND STORAGE MEDIUM

(71) Applicant: CHINA UNIONPAY CO., LTD., Shanghai (CN)

(72) Inventors: Zhijun Lu, Shanghai (CN); Haijian Jiang, Shanghai (CN); Qing Min, Shanghai (CN); Lilin Wang, Shanghai (CN); Hua Cai, Shanghai (CN); Zheng Zhang, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 196 days.

(21) Appl. No.: 17/611,701

(22) PCT Filed: Mar. 24, 2020

(86) PCT No.: PCT/CN2020/080920
§ 371 (c)(1),
(2) Date: Nov. 16, 2021

(87) PCT Pub. No.: WO2020/233223
PCT Pub. Date: Nov. 26, 2020

(65) Prior Publication Data
US 2022/0215374 A1    Jul. 7, 2022

(30) Foreign Application Priority Data

May 17, 2019   (CN) .......................... 201910415316.X

(51) Int. Cl.
*G06Q 20/32*    (2012.01)
*G06Q 20/38*    (2012.01)
*G06Q 30/0601*  (2023.01)

(52) U.S. Cl.
CPC ....... *G06Q 20/326* (2020.05); *G06Q 20/3276* (2013.01); *G06Q 20/3825* (2013.01); *G06Q 30/0635* (2013.01)

(58) Field of Classification Search
CPC ............. G06Q 20/326; G06Q 20/3276; G06Q 20/3825; G06Q 30/0635
(Continued)

(56) References Cited

U.S. PATENT DOCUMENTS 9,710,797 B2    7/2017   Killoran, Jr.
9,843,576 B1 *  12/2017  Peng ...................... H04L 9/3234
(Continued)

FOREIGN PATENT DOCUMENTS

CN    103200179 A    7/2013
CN    103903131 A    7/2014
(Continued)

OTHER PUBLICATIONS

H. Matbouli and Q. Gao, "An overview on web security threats and impact to e-commerce success," 2012 International Conference on Information Technology and e-Services, Sousse, Tunisia, 2012, pp. 1-6. (Year: 2012).*

(Continued)

*Primary Examiner* — Virpi H Kanervo
(74) *Attorney, Agent, or Firm* — ANOVA LAW GROUP, PLLC

(57) ABSTRACT

The embodiments of the application disclose a payment method, apparatus, device, system and storage medium. In the method, a target graphic identifier through the first application app is identified to obtain the first address; wherein, the first app is one of multiple optional apps, and the optional apps comprise apps with payment functions and apps without payment functions; order confirmation information is sent to the first server based on the first page
(Continued)

corresponding to the first address; the second address corresponding to an unified payment gateway fed back by the first server is received; a payment component to pay for the order based on the second page corresponding to the second address is called. A payment method, apparatus, device, system and storage medium in embodiments of the application can reduce interface cost, improve payment efficiency, and users can complete payment by scanning codes using any app.

12 Claims, 12 Drawing Sheets

(58) Field of Classification Search
USPC .......................................................... 705/44
See application file for complete search history.

(56) References Cited

U.S. PATENT DOCUMENTS

| | | | | |
|---|---|---|---|---|
| 11,915,303 | B2* | 2/2024 | Isaacson | G06Q 20/12 |
| 2002/0174062 | A1 | 11/2002 | Sines et al. | |
| 2003/0179406 | A1* | 9/2003 | Seto | H04N 1/00132 |
| | | | | 358/1.15 |
| 2012/0276880 | A1* | 11/2012 | Angorn | G06Q 50/60 |
| | | | | 455/414.1 |
| 2015/0066670 | A1* | 3/2015 | Wentker | H04L 12/66 |
| | | | | 705/16 |

FOREIGN PATENT DOCUMENTS

| | | | | | |
|---|---|---|---|---|---|
| CN | 105427093 | A | | 3/2016 | |
| CN | 105830104 | A | | 8/2016 | |
| CN | 105913245 | A | | 8/2016 | |
| CN | 106127475 | A | * | 11/2016 | |
| CN | 106453436 | A | | 2/2017 | |
| CN | 107423957 | A | | 12/2017 | |
| CN | 108038640 | A | * | 5/2018 | ........... G06F 21/602 |
| CN | 108234434 | A | | 6/2018 | |
| CN | 110223051 | A | | 9/2019 | |
| CN | 111461802 | A | * | 7/2020 | |

OTHER PUBLICATIONS

Z. Jiemiao, "Research on Secure E-Payment Protocol," 2011 International Conference on Information Management, Innovation Management and Industrial Engineering, Shenzhen, China, 2011, pp. 121-123. (Year: 2011).*

Ricardo de Sena Abrahão, Stella Naomi Moriguchi, and Darly Fernando Andrade. Intention of adoption of mobile payment: An analysis in the light of the Unified Theory of Acceptance and Use of Technology (UTAUT). Rai Revista de Administração e Inovação 13 (2016) 221-230. (Year: 2016).*

S. Jana, A. Narayanan and V. Shmatikov, "A Scanner Darkly: Protecting User Privacy from Perceptual Applications," 2013 IEEE Symposium on Security and Privacy, Berkeley, CA, USA, 2013, pp. 349-363 (Year: 2013).*

J. Gao, V. Kulkarni, H. Ranavat, L. Chang and H. Mei, "A 2D Barcode-Based Mobile Payment System," 2009 Third International Conference on Multimedia and Ubiquitous Engineering, Qingdao, China, 2009, pp. 320-329. (Year: 2009).*

S. Dinparast, M. G. Bakhtiari and M. Shajari, "A mobile payment scheme using 2D-barcode," The 5th Conference on Information and Knowledge Technology, Shiraz, Iran, 2013, pp. 400-405. (Year: 2013).*

International Application No. PCT/CN2020/080920, International Search Report, mailed Jun. 15, 2020.

Chinese Patent Application No. 201910415316.X, First Office Action, dated Feb. 22, 2021.

* cited by examiner

PAYMENT METHOD, APPARATUS AND SYSTEM, DEVICE, AND STORAGE MEDIUM

CROSS REFERENCE TO RELATED APPLICATIONS

This application is a national application of PCT/CN2020/080920, filed on Mar. 24, 2020. The contents of PCT/CN2020/080920 are all hereby incorporated by reference for all purposes. This application claims benefit of Chinese Patent Application No. 201910415316.X filed on May 17, 2019, entitled "PAYMENT METHOD, APPARATUS, DEVICE, SYSTEM AND STORAGE MEDIUM," which is hereby incorporated by reference in its entirety for all purposes.

BACKGROUND

In the current two-dimensional code-based payment process, in order to meet the payment needs of users, the server of the acquiring institution needs to interface with different third-party payment tools, and the interface cost is relatively high. At the same time, users cannot freely use any application (Application, APP) to scan codes to complete the payment, thus the payment efficiency is low.

SUMMARY

The embodiments of the application provide a payment method, apparatus, device, system and storage medium, which can reduce interface cost, improve payment efficiency, and can complete payment by scanning codes using any application.

In the first aspect, an embodiment of the application provides a payment method, which comprises:
  identifying a target graphic identifier through the first application app to obtain the first address; wherein, the first app is one of multiple optional apps, and the optional apps comprise apps with payment functions and apps without payment functions;
  sending order confirmation information to the first server based on the first page corresponding to the first address, so that the first server generates an order corresponding to the order confirmation information, the first server sends the order to the second server, and the first server receives and feeds back the second address corresponding to an unified payment gateway sent by the second server;
  receiving the second address fed back by the first server;
  calling a payment component to pay for the order based on the second page corresponding to the second address.

In the second aspect, an embodiment of the application provides a payment method, which comprises:
  generating an order corresponding to order confirmation information sent by a terminal device; wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions;
  sending the order to the second server;
  receiving the second address corresponding to an unified payment gateway sent by the second server;
  feeding back the second address to the terminal device, so that the terminal device calls a payment component to pay for the order based on the page corresponding to the second address.

In the third aspect, an embodiment of the application provides a payment method, which comprises:
  receiving an order sent by the first server; wherein the order is an order corresponding to order confirmation information sent by a terminal device to the first server, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions;
  sending the second address corresponding to an unified payment gateway to the first server, so that the first server feeds back the second address to the terminal device, and the terminal device calls a payment tool to pay for the order based on the page corresponding to the second address.

In the fourth aspect, an embodiment of the application provides a payment apparatus, which comprises:
  an identification module used to identify a target graphic identifier through the first application app to obtain the first address; wherein, the first app is one of multiple optional apps, and the optional apps comprise apps with payment functions and apps without payment functions;
  an order confirmation information sending module used to send order confirmation information to the first server based on the first page corresponding to the first address, so that the first server generates an order corresponding to the order confirmation information, the first server sends the order to the second server, and the first server receives and feeds back the second address corresponding to an unified payment gateway sent by the second server;
  an address receiving module used to receive the second address fed back by the first server;
  a payment module used to call a payment component to pay for the order based on the second page corresponding to the second address.

In the fifth aspect, an embodiment of the application provides a payment apparatus, which comprises:
  an order generating module used to generate an order corresponding to order confirmation information sent by a terminal device; wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions;
  an order sending module used to send the order to the second server;
  an address receiving module used to receive the second address corresponding to an unified payment gateway sent by the second server;
  an address feedback module used to feed back the second address to the terminal device, so that the terminal device calls a payment component to pay for the order based on the page corresponding to the second address.

In the sixth aspect, an embodiment of the application provides a payment apparatus, which comprises:

an order receiving module used to receive an order sent by the first server; wherein the order is an order corresponding to order confirmation information sent by a terminal device to the first server, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions;

an address sending module used to send the second address corresponding to an unified payment gateway to the first server, so that the first server feeds back the second address to the terminal device, and the terminal device calls a payment tool to pay for the order based on the page corresponding to the second address.

In the seventh aspect, an embodiment of the application provides a payment device, which comprises a processor, a memory and a computer program stored in the memory and capable of running on the processor, and when the computer program is executed by the processor, the processor is caused to execute the steps of payment method provided by the embodiment of the application.

In the eighth aspect, an embodiment of the application provides a computer-readable storage medium, the computer-readable storage medium stores a computer program, and when the computer program is executed by a processor, the processor is caused to execute the steps of payment method provided by the embodiment of the application.

In the ninth aspect, an embodiment of the application provides a payment system, which comprises: a first server and a second server;

the first server is used to generate an order corresponding to order confirmation information sent by a terminal device; send the order to the second server; receive the second address corresponding to an unified payment gateway sent by the second server; and feed back the second address to the terminal device, so that the terminal device calls a payment component to pay for the order based on the page corresponding to the second address; wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions;

the second server is used to receive the order sent by the first server; send the second address to the first server, so that the first server feeds back the second address to the terminal device.

DESCRIPTION OF THE DRAWINGS

In order to explain the technical solutions of the embodiments of the application more clearly, the following will briefly introduce the drawings that need to be used in the embodiments of the application. For those of ordinary skill in the art, without creative work, other drawings can be obtained from these drawings.

DETAILED DESCRIPTION

The implementation of the application will be described in further detail below in conjunction with the accompanying drawings and embodiments. The detailed description and drawings of the following embodiments are used to exemplarily illustrate the principle of the application, but cannot be used to limit the scope of the application, that is, the application is not limited to the described embodiments.

In order to solve the problems of the prior art, embodiments of the application provide a payment method, apparatus, device, system and storage medium, which can reduce interface cost, improve payment efficiency, and enable users to complete payment by scanning codes using any application. The following first describes the payment system provided by the embodiment of the application.

Figure 1:
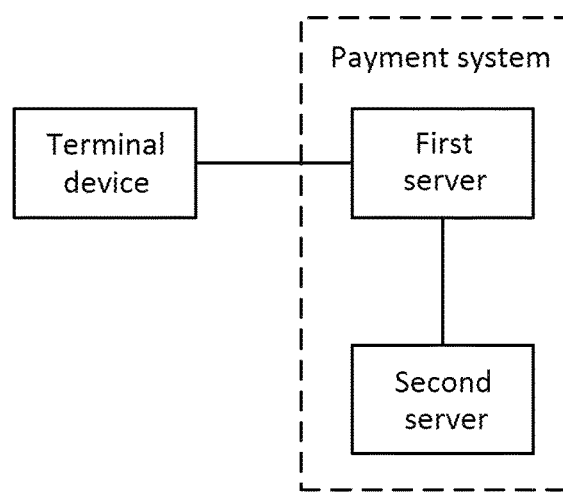
FIG. 1 shows a schematic structural diagram of a payment system provided by an embodiment of the application.

As shown in FIG. 1, FIG. 1 shows a schematic structural diagram of a payment system provided by an embodiment of the application. The payment system may comprise: a first server and a second server. Wherein, The first server is used to generate an order corresponding to order confirmation information sent by a terminal device; send the order to the second server; receive the second address corresponding to an unified payment gateway sent by the second server; and feed back the second address to the terminal device, so that the terminal device calls a payment component to pay for the order based on the page corresponding to the second address; wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions.

The second server is used to receive the order sent by the first server; send the second address to the first server, so that the first server feeds back the second address to the terminal device.

According to the payment system provided by the embodiment of the application, the payment system can reduce interface cost, improve payment efficiency, and the users can complete payment by scanning codes using any application.

In an embodiment of the application, the first server may be an acquiring institution server, and the second server may be a clearing institution server. The unified payment gateway may be an unified payment gateway for clearing institutions.

In an embodiment of the application, the first app may be an app with payment function or an app without payment function. The following describes the cases where the first app is an app with payment function and the first app is an app without payment function.

Figure 2:
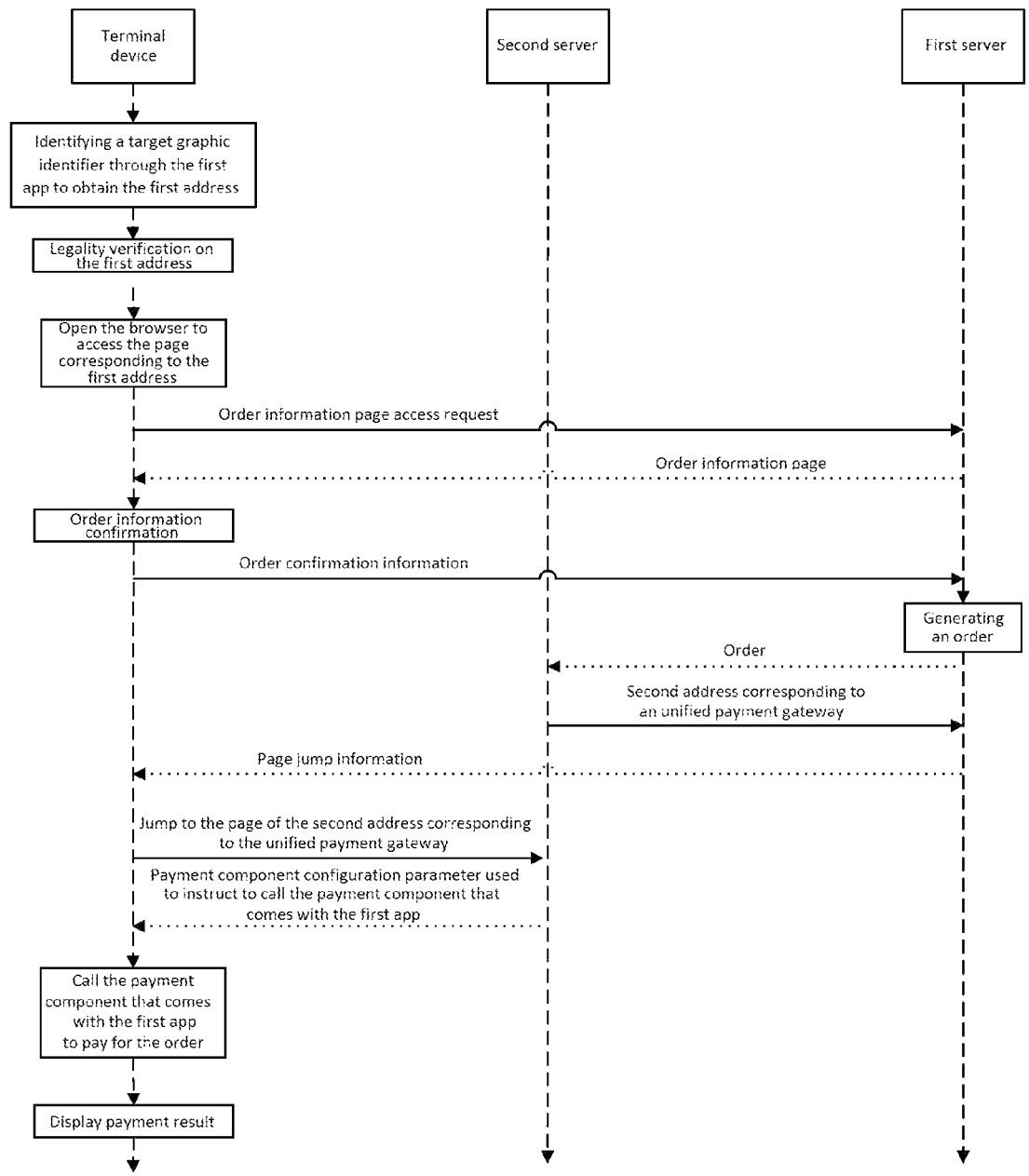
FIG. 2 shows a schematic diagram of the process of using the first app with payment function to perform graphic identifier identification and payment provided by an embodiment of the application.

FIG. 2 shows a schematic diagram of the process of using the first app with payment function to perform graphic identifier identification and payment provided by an embodiment of the application.

The first app can be a payment app, such as a X Dong app, a X Bao app, a X Xin app, a X Tong app, or a certain bank app.

It can be understood that if a target graphic identifier is identified through the first app to obtain the first address, the first app has a graphic identifier identifying function. The graphic identifier mentioned in the embodiments of the application may be a one-dimensional barcode or a two-dimensional barcode (two-dimensional code for short), etc.

In an embodiment of the application, the first address corresponding to the graphic identifier may be a Uniform Resource Locator (URL) address.

First, the terminal device identifies the target graphic identifier through the first app to obtain the first address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page. Then the payment result is shown to the user.

In an embodiment of the application, when sending the second address corresponding to the unified payment gateway to the first server, the second server may send the URL address including the second address corresponding to the unified payment gateway to the first server.

In an embodiment of the application, the second server may generate a URL address including the second address corresponding to the unified payment gateway based on the second address corresponding to the unified payment gateway.

The embodiment of the application does not limit the process of generating the URL address including the second address corresponding to the unified payment gateway, and any available method can be applied to the embodiment of the application.

In an embodiment of the application, when the acquiring institution sends the second address corresponding to the unified payment gateway to the terminal device, it may send page jump information to the terminal device, and the page jump information comprises the second address corresponding to the unified payment gateway. After the terminal device receives the page jump information, the page jumps to the page corresponding to the second address corresponding to the unified payment gateway.

In an embodiment of the application, the second server may send payment component configuration parameters to the terminal device.

After receiving the payment component configuration parameter, the terminal device calls the payment component corresponding to the payment component configuration parameter to pay for the order.

In an embodiment of the application, the payment component configuration parameter is used to instruct to call the payment component that comes with the first app to pay for the order. After receiving the payment component configuration parameter, the terminal device calls the payment component that comes with the first app to pay for the order.

Exemplarily, assuming that the terminal device scans the code through a X Bao with a payment component, the payment component configuration parameter sent by the second server to the terminal device is used to instruct to call the payment component that comes with the X Bao to pay for the order; the terminal device calls the payment component that comes with the X Bao to pay for the order.

In an embodiment of the application, the payment component configuration parameter is used to instruct to call the payment component set by the second server by default to pay for the order.

Exemplarily, assuming that the payment component set by the second server by default is a payment component of a X Bao. Then, the payment component configuration parameter sent by the second server to the terminal device is used to instruct to call the payment component of a X Bao to pay for the order; the terminal device calls the payment component of a X Bao to pay for the order.

In an embodiment of the application, the payment component configuration parameter is used to instruct to call a default payment component of the terminal device to pay for the order.

Exemplarily, assuming that the default payment component of the terminal device is a payment component of a X Bao. Then the payment component configuration parameter sent by the second server to the terminal device is used to instruct to call the default payment component of the terminal device to pay for the order; the terminal device calls the payment component of a X Bao to pay for the order.

In an embodiment of the application, the second server may send configuration parameters corresponding to at least two payment components to the terminal device. At this time, the terminal device can first show the user the options of at least two payment components; and then call the selected payment component to pay for the order.

Exemplarily, assuming that the configuration parameters corresponding to at least two payment components sent by the second server to the terminal device are the configuration parameter corresponding to the payment component of a X Bao, the configuration parameter corresponding to the payment component of a X Xin, and the configuration parameter corresponding to the payment component of a X Fu and the configuration parameter corresponding to the payment component of a X Tong respectively. After receiving the payment component configuration parameters sent by the second server, the terminal device displays the options of the payment component of a X Bao, a payment component of a X Xin, a payment component of a X Fu and a payment component of a X Tong to the user for selection. Assuming that the user selects a payment component of a X Fu, the payment component of a X Fu is called to pay for the order.

In an embodiment of the application, before the terminal device sends the order confirmation information to the first server, the terminal device may also perform legality verification on the identified first address.

Legality verification on the identified first address includes but not limited to the following methods:

Method 1: determine whether the domain name in the first address exists in the legal domain name database; if it exists, it means that the first address is legal.

Exemplarily, assuming that the first address is https://www.XXXX.com/A, the domain name in the first address is: XXXX.com. Determine whether XXXX.com exists in the legal domain name database. If XXXX.com exists in the legal domain name database, the first address "https://www.XXXX.com/A" is legal.

Method 2: determine whether a specific character string exists in the first address; if it exists, it means that the first address is legal.

Exemplarily, assuming that the specific character string is payicbc. Determine whether there is a specific character string "payicbc" in the first address.

Assuming that the first address is https://www.XXXX.com/UWd1pgw-pA7EnHcfYrjnzni. Then the specific character string "payicbc" does not exist in the first address, and the first address is illegal at this time.

Assuming that the first address is https://www.XXXX.com/UWd1pgwpayicbcfYrjnzni. Then the specific character string "payicbc" exists in the first address, and the first address is legal at this time.

In an embodiment of the application, the specific character string may be a character string agreed upon by the clearing institution and the acquiring institution.

Method 3: obtain the signature result corresponding to the domain name in the first address; decrypt the signature result to obtain the decryption result; determine whether the domain name in the first address is the same as the decryption result; if they are the same, it means that the first address is legal.

Exemplarily, assuming that the first address is https://www.XXXX.com/A, the domain name in the first address is: XXXX.com. A is the signature result corresponding to the domain name "XXXX.com".

The signature result is decrypted, and the decryption result P is obtained. If the domain name "XXXX.com" is the same as the decryption result P, it means that the first address is legal.

In the embodiment of the application, when the acquiring institution submits a two-dimensional code generation request to the clearing institution, it can use the private key of the clearing institution to sign the domain name and generate a signature result corresponding to the domain name. After scanning the code, the terminal device uses the public key of the clearing institution to decrypt the signature result to obtain the decryption result. If the domain name in the first address is the same as the decryption result, it means that the first address is legal.

By verifying the legality of the first address, it is possible to prevent users from accessing illegal sites and ensure the safety of users' property.

Figure 3:
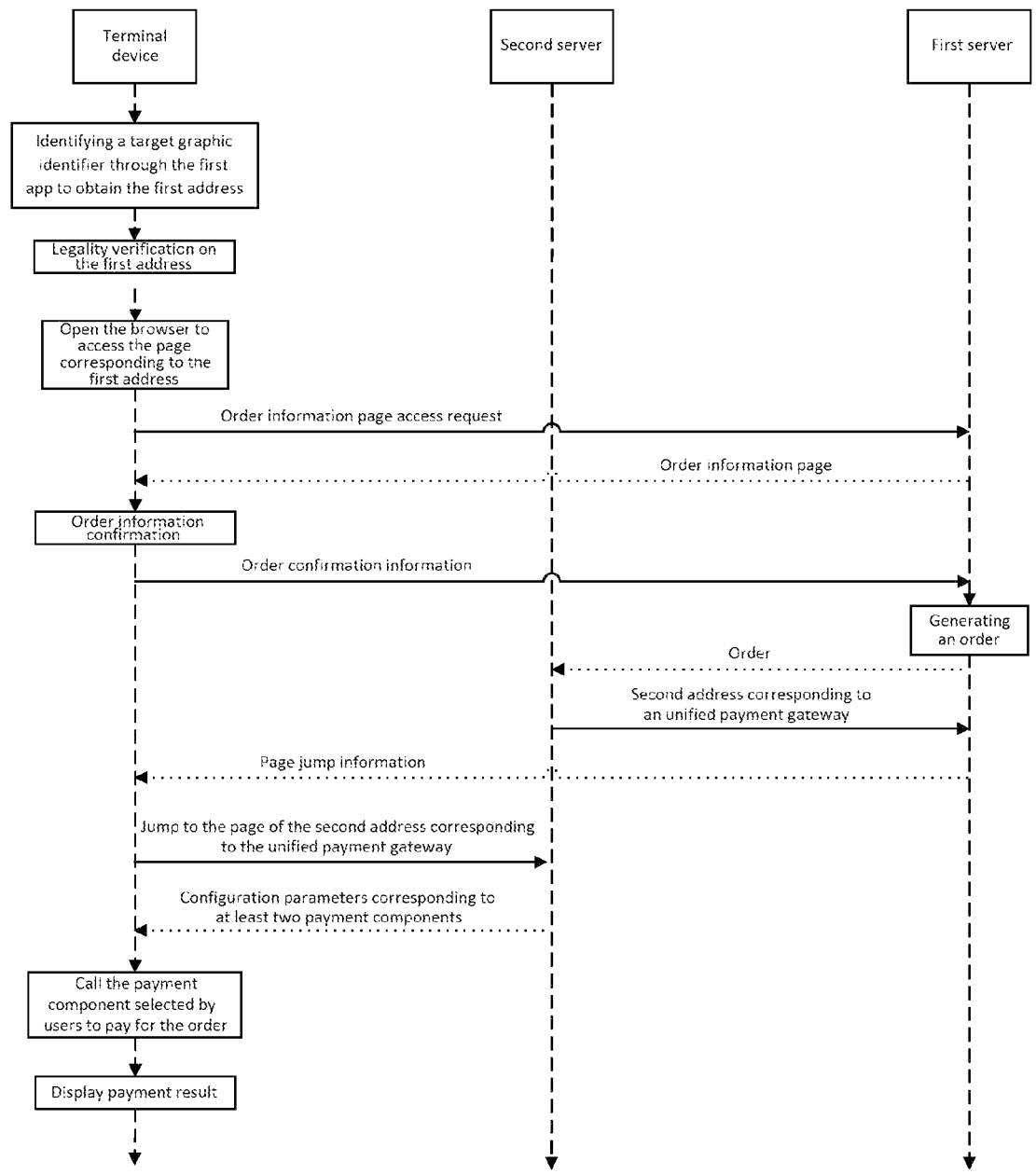
FIG. 3 shows a schematic diagram of the first process of using the first app without payment function to perform graphic identifier identification and payment provided by an embodiment of the application.

FIG. 3 shows a schematic diagram of the first process of using the first app without payment function to perform graphic identifier identification and payment provided by an embodiment of the application.

The first app may be: a browser app, a camera app, a chat app, a video app, a news app, a hospital app, or a transportation app, etc.

It can be understood that if a target graphic identifier is identified through the first app to obtain the first address, the first app has a graphic identifier identifying function.

First, the terminal device identifies the target graphic identifier through the first app to obtain the first address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page. Then the payment result is shown to the user.

In an embodiment of the application, when sending the second address corresponding to the unified payment gateway to the first server, the second server may send the URL address including the second address corresponding to the unified payment gateway to the first server.

In an embodiment of the application, the second server may generate a URL address including the second address corresponding to the unified payment gateway based on the second address corresponding to the unified payment gateway.

In an embodiment of the application, when the acquiring institution sends the second address corresponding to the unified payment gateway to the terminal device, it may send page jump information to the terminal device, and the page jump information comprises the second address corresponding to the unified payment gateway. After the terminal device receives the page jump information, the page jumps to the page corresponding to the second address corresponding to the unified payment gateway.

In an embodiment of the application, the second server may send payment component configuration parameters to the terminal device.

After receiving the payment component configuration parameter, the terminal device calls the payment component corresponding to the payment component configuration parameter to pay for the order.

In an embodiment of the application, the second server may send configuration parameters corresponding to at least two payment components to the terminal device. At this time, the terminal device can first show the user the options of at least two payment components; and then call the selected payment component to pay for the order.

Exemplarily, assuming that the configuration parameters corresponding to at least two payment components sent by the second server to the terminal device are the configuration parameter corresponding to the payment component of a X Bao, the configuration parameter corresponding to the payment component of a X Xin and the configuration parameter corresponding to the payment component of a X Tong respectively. After receiving the payment component configuration parameters sent by the second server, the terminal device displays the options of the payment component of a X Bao, a payment component of a X Xin and a payment component of a X Tong to the user for selection. Assuming that the user selects a payment component of a X Tong, the payment component of a X Tong is called to pay for the order.

In an embodiment of the application, before the terminal device sends the order confirmation information to the first server, the terminal device may also perform legality verification on the identified first address.

Legality verification on the identified first address includes but not limited to the following methods:

Method 1: determine whether the domain name in the first address exists in the legal domain name database; if it exists, it means that the first address is legal.

Exemplarily, assuming that the first address is https://www.XXXX.com/A, the domain name in the first address is: XXXX.com. Determine whether XXXX.com exists in the legal domain name database. If XXXX.com exists in the legal domain name database, the first address "https://www.XXXX.com/A" is legal.

Method 2: determine whether a specific character string exists in the first address; if it exists, it means that the first address is legal.

Exemplarily, assuming that the specific character string is payicbc. Determine whether there is a specific character string "payicbc" in the first address.

Assuming that the first address is https://www.XXXX.com/UWd1pgw-pA7EnHcfYrjnzni. Then the specific character string "payicbc" does not exist in the first address, and the first address is illegal at this time.

Assuming that the first address is https://www.XXXX.com/UWd1pgwpayicbcfYrjnzni. Then the specific character string "payicbc" exists in the first address, and the first address is legal at this time.

In an embodiment of the application, the specific character string may be a character string agreed upon by the clearing institution and the acquiring institution.

Method 3: obtain the signature result corresponding to the domain name in the first address; decrypt the signature result to obtain the decryption result; determine whether the domain name in the first address is the same as the decryption result; if they are the same, it means that the first address is legal.

Exemplarily, assuming that the first address is https://www.XXXX.com/A, the domain name in the first address is: XXXX.com. A is the signature result corresponding to the domain name "XXXX.com".

The signature result is decrypted, and the decryption result P is obtained. If the domain name "XXXX.com" is the same as the decryption result P, it means that the first address is legal.

In the embodiment of the application, when the acquiring institution submits a two-dimensional code generation request to the clearing institution, it can use the private key of the clearing institution to sign the domain name and generate a signature result corresponding to the domain name. After scanning the code, the terminal device uses the public key of the clearing institution to decrypt the signature result to obtain the decryption result. If the domain name in the first address is the same as the decryption result, it means that the first address is legal.

By verifying the legality of the first address, it is possible to prevent users from accessing illegal sites and ensure the safety of users' property.

Figure 4:
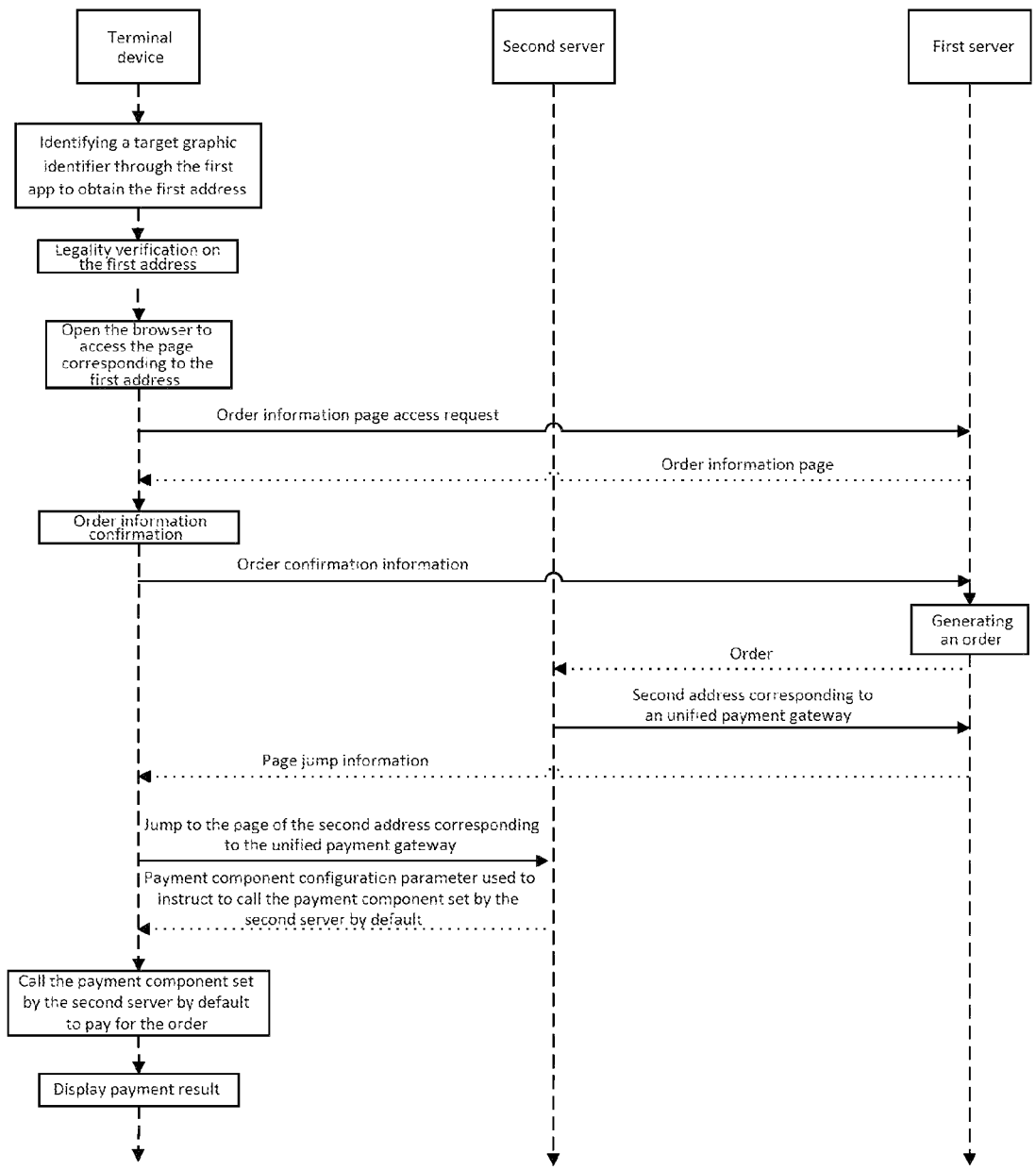
FIG. 4 shows a schematic diagram of the second process of using the first app without payment function to perform graphic identifier identification and payment provided by an embodiment of the application.

FIG. 4 shows a schematic diagram of the second process of using the first app without payment function to perform graphic identifier identification and payment provided by an embodiment of the application.

It can be understood that if a target graphic identifier is identified through the first app to obtain the first address, the first app has a graphic identifier identifying function.

First, the terminal device identifies the target graphic identifier through the first app to obtain the first address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page. Then the payment result is shown to the user.

In an embodiment of the application, when sending the second address corresponding to the unified payment gateway to the first server, the second server may send the URL address including the second address corresponding to the unified payment gateway to the first server.

In an embodiment of the application, the second server may generate a URL address including the second address corresponding to the unified payment gateway based on the second address corresponding to the unified payment gateway.

In an embodiment of the application, when the acquiring institution sends the second address corresponding to the unified payment gateway to the terminal device, it may send page jump information to the terminal device, and the page jump information comprises the second address corresponding to the unified payment gateway. After the terminal device receives the page jump information, the page jumps to the page corresponding to the second address corresponding to the unified payment gateway.

In an embodiment of the application, the second server may send payment component configuration parameters to the terminal device.

After receiving the payment component configuration parameter, the terminal device calls the payment component corresponding to the payment component configuration parameter to pay for the order.

In an embodiment of the application, the payment component configuration parameter is used to instruct to call the payment component set by the second server by default to pay for the order.

Exemplarily, assuming that the payment component set by the second server by default is a payment component of a X Bao. Then, the payment component configuration parameter sent by the second server to the terminal device is used to instruct to call the payment component of a X Bao to pay for the order; the terminal device calls the payment component of a X Bao to pay for the order.

In an embodiment of the application, before the terminal device sends the order confirmation information to the first server, the terminal device may also perform legality verification on the identified first address.

Legality verification on the identified first address includes but not limited to the following methods:

Method 1: determine whether the domain name in the first address exists in the legal domain name database; if it exists, it means that the first address is legal.

Exemplarily, assuming that the first address is https://www.XXXX.com/A, the domain name in the first address is: XXXX.com. Determine whether XXXX.com exists in the legal domain name database. If XXXX.com exists in the legal domain name database, the first address "https://www.XXXX.com/A" is legal.

Method 2: determine whether a specific character string exists in the first address; if it exists, it means that the first address is legal.

Exemplarily, assuming that the specific character string is payicbc. Determine whether there is a specific character string "payicbc" in the first address.

Assuming that the first address is https://www.XXXX.com/UWd1pgw-pA7EnHcfYrjnzni. Then the specific character string "payicbc" does not exist in the first address, and the first address is illegal at this time.

Assuming that the first address is https://www.XXXX.com/UWd1pgwpayicbcfYrjnzni. Then the specific character string "payicbc" exists in the first address, and the first address is legal at this time.

In an embodiment of the application, the specific character string may be a character string agreed upon by the clearing institution and the acquiring institution.

Method 3: obtain the signature result corresponding to the domain name in the first address; decrypt the signature result to obtain the decryption result; determine whether the domain name in the first address is the same as the decryption result; if they are the same, it means that the first address is legal.

Exemplarily, assuming that the first address is https://www.XXXX.com/A, the domain name in the first address is: XXXX.com. A is the signature result corresponding to the domain name "XXXX.com".

The signature result is decrypted, and the decryption result P is obtained. If the domain name "XXXX.com" is the same as the decryption result P, it means that the first address is legal.

In the embodiment of the application, when the acquiring institution submits a two-dimensional code generation request to the clearing institution, it can use the private key of the clearing institution to sign the domain name and generate a signature result corresponding to the domain name. After scanning the code, the terminal device uses the public key of the clearing institution to decrypt the signature result to obtain the decryption result. If the domain name in the first address is the same as the decryption result, it means that the first address is legal.

By verifying the legality of the first address, it is possible to prevent users from accessing illegal sites and ensure the safety of users' property.

Figure 5:
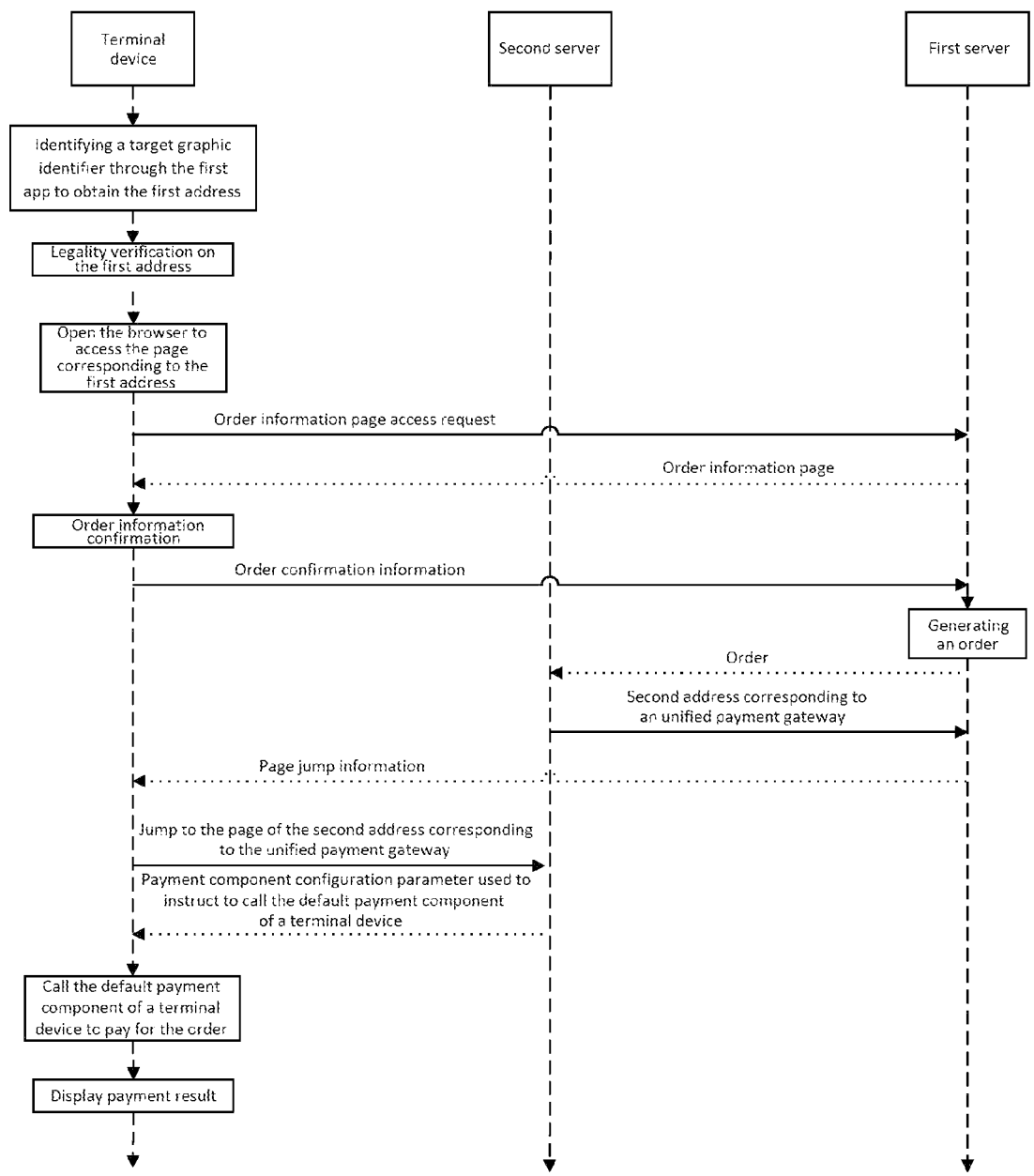
FIG. 5 shows a schematic diagram of the third process of using the first app without payment function to perform graphic identifier identification and payment provided by an embodiment of the application.

FIG. 5 shows a schematic diagram of the third process of using the first app without payment function to perform graphic identifier identification and payment provided by an embodiment of the application.

It can be understood that if a target graphic identifier is identified through the first app to obtain the first address, the first app has a graphic identifier identifying function.

First, the terminal device identifies the target graphic identifier through the first app to obtain the first address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page. Then the payment result is shown to the user.

In an embodiment of the application, when sending the second address corresponding to the unified payment gateway to the first server, the second server may send the URL address including the second address corresponding to the unified payment gateway to the first server.

In an embodiment of the application, the second server may generate a URL address including the second address corresponding to the unified payment gateway based on the second address corresponding to the unified payment gateway.

In an embodiment of the application, when the acquiring institution sends the second address corresponding to the unified payment gateway to the terminal device, it may send page jump information to the terminal device, and the page jump information comprises the second address corresponding to the unified payment gateway. After the terminal device receives the page jump information, the page jumps to the page corresponding to the second address corresponding to the unified payment gateway.

In an embodiment of the application, the second server may send payment component configuration parameters to the terminal device.

After receiving the payment component configuration parameter, the terminal device calls the payment component corresponding to the payment component configuration parameter to pay for the order.

In an embodiment of the application, the payment component configuration parameter is used to instruct to call a default payment component of the terminal device to pay for the order.

Exemplarily, assuming that the default payment component of the terminal device is a payment component of a X Bao. Then the payment component configuration parameter sent by the second server to the terminal device is used to instruct to call the default payment component of the terminal device to pay for the order; the terminal device calls the payment component of a X Bao to pay for the order.

In an embodiment of the application, before the terminal device sends the order confirmation information to the first server, the terminal device may also perform legality verification on the identified first address.

Legality verification on the identified first address includes but not limited to the following methods:

Method 1: determine whether the domain name in the first address exists in the legal domain name database; if it exists, it means that the first address is legal.

Exemplarily, assuming that the first address is https://www.XXXX.com/A, the domain name in the first address is: XXXX.com. Determine whether XXXX.com exists in the legal domain name database. If XXXX.com exists in the legal domain name database, the first address "https://www.XXXX.com/A" is legal.

Method 2: determine whether a specific character string exists in the first address; if it exists, it means that the first address is legal.

Exemplarily, assuming that the specific character string is payicbc. Determine whether there is a specific character string "payicbc" in the first address.

Assuming that the first address is https://www.XXXX.com/UWd1pgw-pA7EnHcfYrjnzni. Then the specific character string "payicbc" does not exist in the first address, and the first address is illegal at this time.

Assuming that the first address is https://www.XXXX.com/UWd1pgwpayicbcfYrjnzni. Then the specific character string "payicbc" exists in the first address, and the first address is legal at this time.

In an embodiment of the application, the specific character string may be a character string agreed upon by the clearing institution and the acquiring institution.

Method 3: obtain the signature result corresponding to the domain name in the first address; decrypt the signature result to obtain the decryption result; determine whether the domain name in the first address is the same as the decryption result; if they are the same, it means that the first address is legal.

Exemplarily, assuming that the first address is https://www.XXXX.com/A, the domain name in the first address is: XXXX.com. A is the signature result corresponding to the domain name "XXXX.com".

The signature result is decrypted, and the decryption result P is obtained. If the domain name "XXXX.com" is the same as the decryption result P, it means that the first address is legal.

In the embodiment of the application, when the acquiring institution submits a two-dimensional code generation request to the clearing institution, it can use the private key of the clearing institution to sign the domain name and generate a signature result corresponding to the domain name. After scanning the code, the terminal device uses the public key of the clearing institution to decrypt the signature result to obtain the decryption result. If the domain name in the first address is the same as the decryption result, it means that the first address is legal.

By verifying the legality of the first address, it is possible to prevent users from accessing illegal sites and ensure the safety of users' property.

Figure 6:
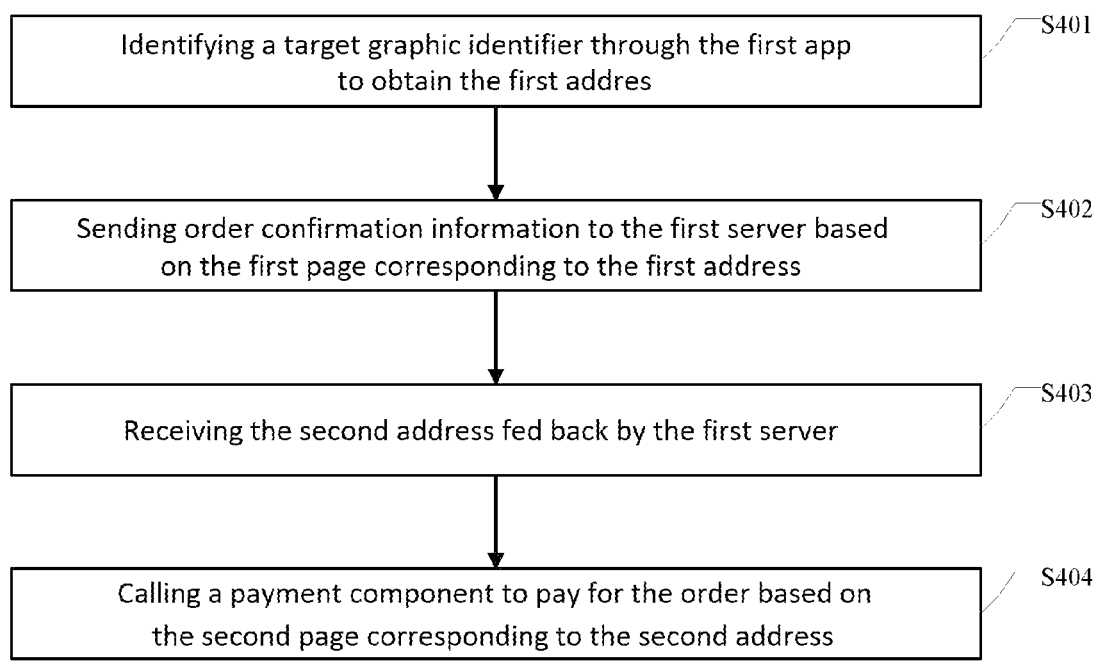
FIG. 6 shows a schematic flowchart of a payment method applied to a terminal device provided by an embodiment of the application.

Based on the foregoing, an embodiment of the application provides a payment method applied to a terminal device, as shown in FIG. 6. FIG. 6 shows a schematic flowchart of a payment method applied to a terminal device provided by an embodiment of the application. The payment method applied to the terminal device may comprise:

S401: identifying a target graphic identifier through the first application app to obtain the first address.

Wherein, the first app is one of multiple optional apps, and the optional apps comprise apps with payment functions and apps without payment functions.

S402: sending order confirmation information to the first server based on the first page corresponding to the first address, so that the first server generates an order corresponding to the order confirmation information, the first server sends the order to the second server, and the first server receives and feeds back the second address corresponding to an unified payment gateway sent by the second server.

S403: receiving the second address fed back by the first server.

S404: calling a payment component to pay for the order based on the second page corresponding to the second address.

It can be understood that if a target graphic identifier is identified through the first app to obtain the first address, the first app has a graphic identifier identifying function.

First, the terminal device identifies the target graphic identifier through the first app to obtain the first address.

The graphic identifier mentioned in the embodiments of the application may be a one-dimensional barcode or a two-dimensional barcode, etc. The first address corresponding to the graphic identifier may be a URL address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page. Then the payment result is shown to the user.

In an embodiment of the application, the first app may comprise:

a browser app, a camera app, a chat app, a video app, a news app, a hospital app, a transportation app, or payment app, etc.

In an embodiment of the application, when the acquiring institution sends the second address corresponding to the unified payment gateway to the terminal device, it may send page jump information to the terminal device, and the page jump information comprises the second address corresponding to the unified payment gateway. Based on this, receiving the second address fed back by the first server may comprise:

receiving page jump information sent by the first server; where, the page jump information comprises the second address corresponding to the unified payment gateway.

In an embodiment of the application, the second server may send payment component configuration parameters to the terminal device. After receiving the payment component configuration parameter, the terminal device calls the payment component corresponding to the payment component configuration parameter to pay for the order. Based on this, calling the payment component to pay for the order may comprise:

receiving payment component configuration parameters sent by the second server; calling the payment component corresponding to the payment component configuration parameter to pay for the order.

In an embodiment of the application, the payment component configuration parameter is used to instruct to call the payment component that comes with the first app to pay for the order. After receiving the payment component configuration parameter, the terminal device calls the payment component that comes with the first app to pay for the order.

Exemplarily, assuming that the terminal device scans the code through a X Bao with a payment component, the payment component configuration parameter sent by the second server to the terminal device is used to instruct to call the payment component that comes with the X Bao to pay for the order; the terminal device calls the payment component that comes with the X Bao to pay for the order.

In an embodiment of the application, the payment component configuration parameter is used to instruct to call the payment component set by the second server by default to pay for the order.

Exemplarily, assuming that the payment component set by the second server by default is a payment component of a X Bao. Then, the payment component configuration parameter sent by the second server to the terminal device is used to instruct to call the payment component of a X Bao to pay for the order; the terminal device calls the payment component of a X Bao to pay for the order.

In an embodiment of the application, the payment component configuration parameter is used to instruct to call a default payment component of the terminal device to pay for the order.

Exemplarily, assuming that the default payment component of the terminal device is a payment component of a X Bao. Then the payment component configuration parameter sent by the second server to the terminal device is used to instruct to call the default payment component of the terminal device to pay for the order; the terminal device calls the payment component of a X Bao to pay for the order.

In an embodiment of the application, the second server may send configuration parameters corresponding to at least two payment components to the terminal device. At this time, the terminal device can first show the user the options of at least two payment components; and then call the selected payment component to pay for the order.

Exemplarily, assuming that the configuration parameters corresponding to at least two payment components sent by the second server to the terminal device are the configuration parameter corresponding to the payment component of a X Bao, the configuration parameter corresponding to the payment component of a X Xin and the configuration parameter corresponding to the payment component of a X Tong respectively. After receiving the payment component configuration parameters sent by the second server, the terminal device displays the options of the payment component of a X Bao, a payment component of a X Xin and a payment component of a X Tong to the user for selection. Assuming that the user selects a payment component of a X Tong, the payment component of a X Tong is called to pay for the order.

Through the payment method of the embodiment of the application, the terminal device can use any application to scan the code to complete the payment. In addition, the acquiring institution does not need to interface with different third-party payment tools, which can reduce interface cost and improve payment efficiency.

In an embodiment of the application, before sending the order confirmation information to the first server based on the first page corresponding to the first address, the payment method applied to the terminal device provided by the embodiment of the application further comprises:

performing legality verification on the first address.

In an embodiment of the application, performing legality verification on the first address may comprise: determining whether the domain name in the first address exists in a legal domain name database; if it exists, it means that the first address is legal.

Exemplarily, assuming that the first address is https://www.XXXX.com/A, the domain name in the first address is: XXXX.com. Determine whether XXXX.com exists in the legal domain name database. If XXXX.com exists in the legal domain name database, the first address "https://www.XXXX.com/A" is legal.

In an embodiment of the application, performing legality verification on the first address may comprise: determining whether a specific character string exists in the first address; if it exists, it means that the first address is legal.

Exemplarily, assuming that the specific character string is payicbc. Determine whether there is a specific character string "payicbc" in the first address.

Assuming that the first address is https://www.XXXX-.com/UWd1pgw-pA7EnHcfYrjnzni. Then the specific character string "payicbc" does not exist in the first address, and the first address is illegal at this time.

Assuming that the first address is https://www.XXXX-.com/UWd1pgwpayicbcfYrjnzni. Then the specific character string "payicbc" exists in the first address, and the first address is legal at this time.

In an embodiment of the application, the specific character string may be a character string agreed upon by the clearing institution and the acquiring institution.

In an embodiment of the application, performing legality verification on the first address may comprise: obtaining the signature result corresponding to the domain name in the first address; decrypt the signature result to obtain the decryption result; determine whether the domain name in the first address is the same as the decryption result; if they are the same, it means that the first address is legal.

Exemplarily, assuming that the first address is https://www.XXXX.com/A, the domain name in the first address is: XXXX.com. A is the signature result corresponding to the domain name "XXXX.com".

The signature result is decrypted, and the decryption result P is obtained. If the domain name "XXXX.com" is the same as the decryption result P, it means that the first address is legal.

In the embodiment of the application, when the acquiring institution submits a two-dimensional code generation request to the clearing institution, it can use the private key of the clearing institution to sign the domain name and generate a signature result corresponding to the domain name. After scanning the code, the terminal device uses the public key of the clearing institution to decrypt the signature result to obtain the decryption result. If the domain name in the first address is the same as the decryption result, it means that the first address is legal.

By verifying the legality of the first address, it is possible to prevent users from accessing illegal sites and ensure the safety of users' property.

Figure 7:
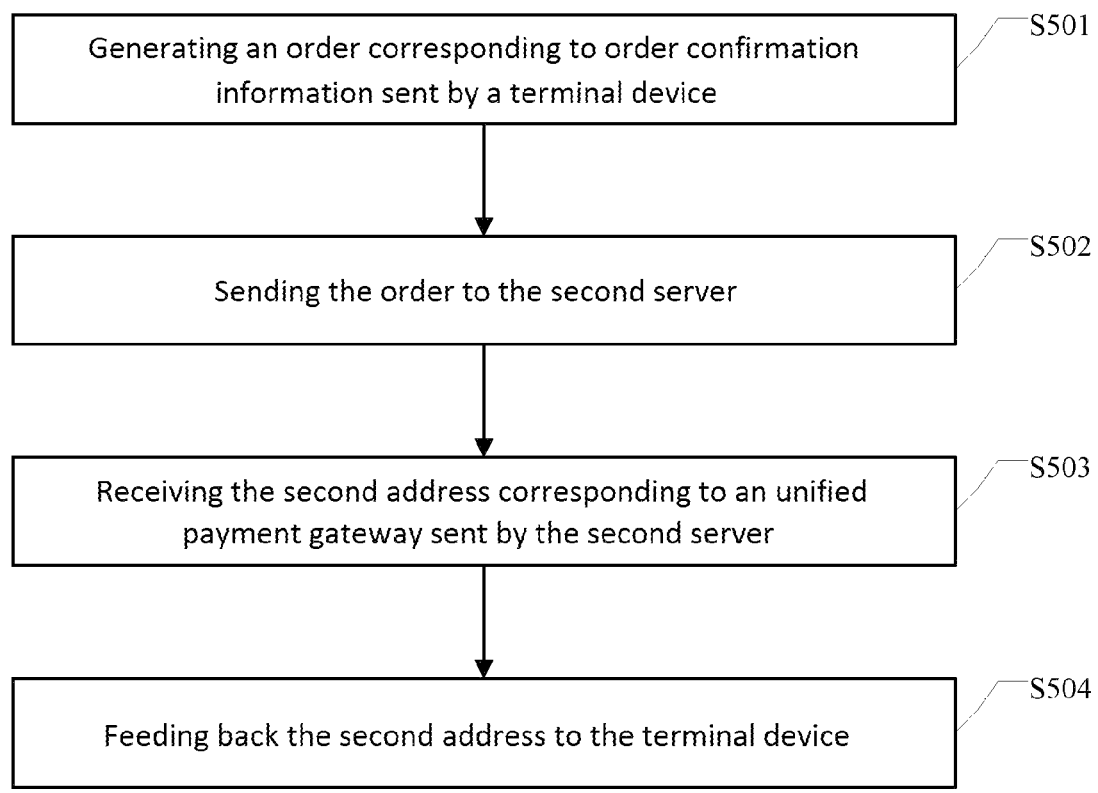
FIG. 7 shows a schematic flowchart of a payment method applied to the first server provided by an embodiment of the application.

The embodiment of the application also provides a payment method applied to the first server, as shown in FIG. 7. FIG. 7 shows a schematic flowchart of a payment method applied to the first server provided by an embodiment of the application.

The payment method applied to the first server may comprise:

S501: generating an order corresponding to order confirmation information sent by a terminal device.

Wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions.

S502: sending the order to the second server.

S503: receiving the second address corresponding to an unified payment gateway sent by the second server.

S504: feeding back the second address to the terminal device, so that the terminal device calls a payment component to pay for the order based on the page corresponding to the second address.

It can be understood that if a target graphic identifier is identified through the first app to obtain the first address, the first app has a graphic identifier identifying function.

First, the terminal device identifies the target graphic identifier through the first app to obtain the first address.

The graphic identifier mentioned in the embodiments of the application may be a one-dimensional barcode or a two-dimensional barcode, etc. The first address corresponding to the graphic identifier may be a URL address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page.

In an embodiment of the application, when sending the second address corresponding to the unified payment gateway to the first server, the second server may send the URL address including the second address corresponding to the unified payment gateway to the first server. Based on this, receiving the second address of the unified payment gateway sent by the second server may comprise: receiving a URL address sent by the second server; wherein, the URL address comprises the second address corresponding to the unified payment gateway.

In an embodiment of the application, the second server may generate a URL address including the second address corresponding to the unified payment gateway based on the second address corresponding to the unified payment gateway.

In an embodiment of the application, when the acquiring institution sends the second address corresponding to the unified payment gateway to the terminal device, it may send page jump information to the terminal device, and the page jump information comprises the second address corresponding to the unified payment gateway. Based on this, feeding back the second address to the terminal device may comprise: sending page jump information to the terminal device; wherein, the page jump information comprises the second address corresponding to the unified payment gateway.

Figure 8:
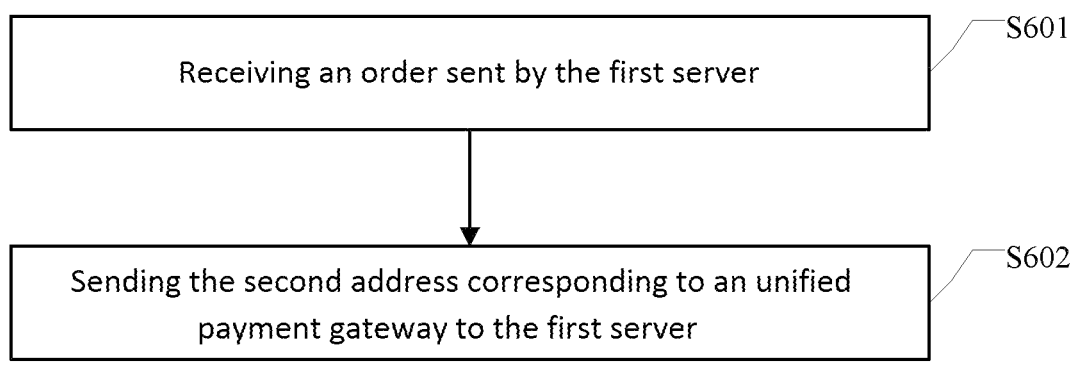
FIG. 8 shows a schematic flowchart of a payment method applied to the second server provided by an embodiment of the application.

The embodiment of the application also provides a payment method applied to the second server, as shown in FIG. 8. FIG. 8 shows a schematic flowchart of a payment method applied to the second server provided by an embodiment of the application.

The payment method applied to the second server may comprise:

S601: receiving an order sent by the first server.

Wherein the order is an order corresponding to order confirmation information sent by a terminal device to the first server, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions.

S602: sending the second address corresponding to an unified payment gateway to the first server, so that the first server feeds back the second address to the terminal device, and the terminal device calls a payment tool to pay for the order based on the page corresponding to the second address.

It can be understood that if a target graphic identifier is identified through the first app to obtain the first address, the first app has a graphic identifier identifying function.

First, the terminal device identifies the target graphic identifier through the first app to obtain the first address.

The graphic identifier mentioned in the embodiments of the application may be a one-dimensional barcode or a two-dimensional barcode, etc. The first address corresponding to the graphic identifier may be a URL address.

In an embodiment of the application, the page corresponding to the first address may be a payment page for directly making payments to the merchant, or may be a display page of the merchant's merchandise.

When the page corresponding to the first address is the payment page for directly making payments to the merchant, the order confirmation information may be directly sent to the first server based on the page.

When the page corresponding to the first address is the display page of the merchant's merchandise, the user needs to enter the order information confirmation page through the process of page browsing, merchandise selection, and confirmation of the merchandise to be purchased and so on. After the user confirms the order information, the user sends the order confirmation information to the first server.

Exemplarily, the terminal device uses the application to scan the two-dimensional code of the merchant, and identifies the address corresponding to the two-dimensional code; uses the browser to access the identified address, and then sends an order information page access request to the first server; the first server responds to the order information page access request and feeds back the order information page to the terminal device; the terminal device displays the order information page; after the user confirms that the order information is correct based on the displayed order information page, the terminal device sends the order confirmation information to the first server.

After receiving the order confirmation information, the first server generates an order corresponding to the order confirmation information; and sends the order to the second server.

After receiving the order, the second server sends the second address corresponding to the unified payment gateway to the first server.

After receiving the second address corresponding to the unified payment gateway, the acquiring institution sends the second address corresponding to the unified payment gateway to the terminal device.

The terminal device accesses the page of the second address corresponding to the unified payment gateway, and calls a payment component to pay for the order based on the page.

In an embodiment of the application, when sending the second address corresponding to the unified payment gateway to the first server, the second server may send the URL address including the second address corresponding to the unified payment gateway to the first server.

In an embodiment of the application, before sending the URL address including the second address corresponding to the unified payment gateway to the first server, the payment method applied to the second server provided by the embodiment of the application may further comprise: generating the URL address including the second address corresponding to the unified payment gateway.

In an embodiment of the application, the payment method applied to the second server provided by the embodiment of the application may further comprise: sending payment component configuration parameters to the terminal device, so that the terminal device calls the payment component corresponding to the payment component configuration parameter to pay for the order.

In an embodiment of the application, the payment component configuration parameter is used to instruct to call the payment component that comes with the first app to pay for the order. After receiving the payment component configuration parameter, the terminal device calls the payment component that comes with the first app to pay for the order.

Exemplarily, assuming that the terminal device scans the code through a X Bao with a payment component, the payment component configuration parameter sent by the second server to the terminal device is used to instruct to call the payment component that comes with the X Bao to pay for the order; the terminal device calls the payment component that comes with the X Bao to pay for the order.

In an embodiment of the application, the payment component configuration parameter is used to instruct to call the payment component set by the second server by default to pay for the order.

Exemplarily, assuming that the payment component set by the second server by default is a payment component of a X Bao. Then, the payment component configuration parameter sent by the second server to the terminal device is used to instruct to call the payment component of a X Bao to pay for the order; the terminal device calls the payment component of a X Bao to pay for the order.

In an embodiment of the application, the payment component configuration parameter is used to instruct to call a default payment component of the terminal device to pay for the order.

Exemplarily, assuming that the default payment component of the terminal device is a payment component of a X Bao. Then the payment component configuration parameter sent by the second server to the terminal device is used to instruct to call the default payment component of the terminal device to pay for the order; the terminal device calls the payment component of a X Bao to pay for the order.

In an embodiment of the application, the second server may send configuration parameters corresponding to at least two payment components to the terminal device. At this time, the terminal device can first show the user the options of at least two payment components; and then call the selected payment component to pay for the order.

Exemplarily, assuming that the configuration parameters corresponding to at least two payment components sent by the second server to the terminal device are the configuration parameter corresponding to the payment component of a X Bao, the configuration parameter corresponding to the payment component of a X Xin and the configuration parameter corresponding to the payment component of a X Tong respectively. After receiving the payment component configuration parameters sent by the second server, the terminal device displays the options of the payment component of a X Bao, a payment component of a X Xin and a payment component of a X Tong to the user for selection. Assuming that the user selects a payment component of a X Tong, the payment component of a X Tong is called to pay for the order.

Figure 9:
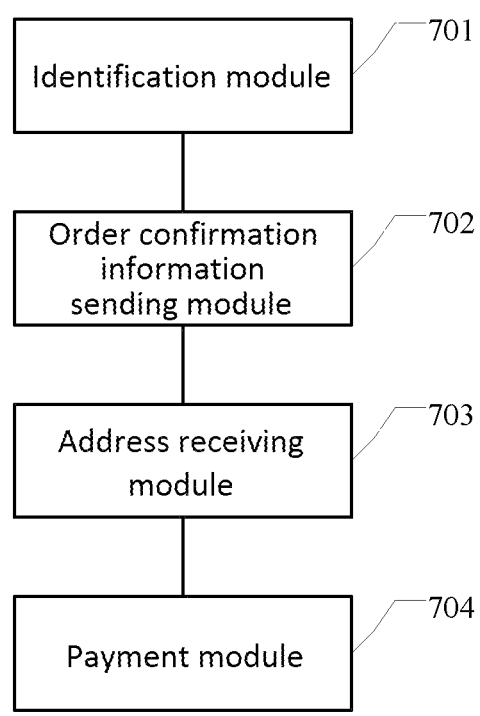
FIG. 9 shows a schematic structural diagram of a payment processing apparatus applied to a terminal device provided by an embodiment of the application.

The embodiment of the application provides a payment apparatus applied to a terminal device, as shown in FIG. 9. FIG. 9 shows a schematic structural diagram of a payment apparatus applied to a terminal device provided by an embodiment of the application. The payment apparatus applied to the terminal device may comprise:

an identification module 701 used to identify a target graphic identifier through the first application app to obtain the first address.

Wherein, the first app is one of multiple optional apps, and the optional apps comprise apps with payment functions and apps without payment functions.

An order confirmation information sending module 702 used to send order confirmation information to the first server based on the first page corresponding to the first address, so that the first server generates an order corresponding to the order confirmation information, the first server sends the order to the second server, and the first server receives and feeds back the second address corresponding to an unified payment gateway sent by the second server.

An address receiving module 703 used to receive the second address fed back by the first server.

A payment module 704 used to call a payment component to pay for the order based on the second page corresponding to the second address.

In an embodiment of the application, the first app comprises:

browser apps, camera apps, chat apps, video apps, news apps, hospital apps, transportation apps, or payment apps, etc.

In an embodiment of the application, the address receiving module 703 is specifically used to:

receive page jump information sent by the first server; wherein, the page jump information comprises the second address corresponding to the unified payment gateway.

In an embodiment of the application, the payment module 704 comprises:
- a payment component configuration parameter receiving unit used to receive payment component configuration parameters sent by the second server;
- a payment unit used to call the payment component corresponding to the payment component configuration parameter to pay for the order.

In an embodiment of the application, the payment component configuration parameter is used to instruct to call the payment component that comes with the first app to pay for the order.

In an embodiment of the application, the payment component configuration parameter is used to instruct to call the payment component set by the second server by default to pay for the order.

In an embodiment of the application, the payment component configuration parameter is used to instruct to call the default payment component of the terminal device to pay for the order.

In an embodiment of the application, the payment component configuration parameters sent by the second server comprise configuration parameters corresponding to at least two payment components. The payment unit is specifically used to: show the user the options of at least two payment components; call the selected payment component to pay for the order.

In an embodiment of the application, the payment apparatus applied to terminal device provided by the embodiment of the application further comprises:
- a legality verification module used to verify the legality of the first address.

In an embodiment of the application, the legality verification module is specifically used to:
determine whether the domain name in the first address exists in the legal domain name database; if it exists, it means that the first address is legal.

In an embodiment of the application, the legality verification module is specifically used to:
determine whether there is a specific character string in the first address; if it exists, it means that the first address is legal.

In an embodiment of the application, the legality verification module is specifically used to:
obtain the signature result corresponding to the domain name in the first address; decrypt the signature result to obtain the decryption result; determine whether the domain name in the first address is the same as the decryption result; if they are the same, it means that the first address is legal.

Figure 10:
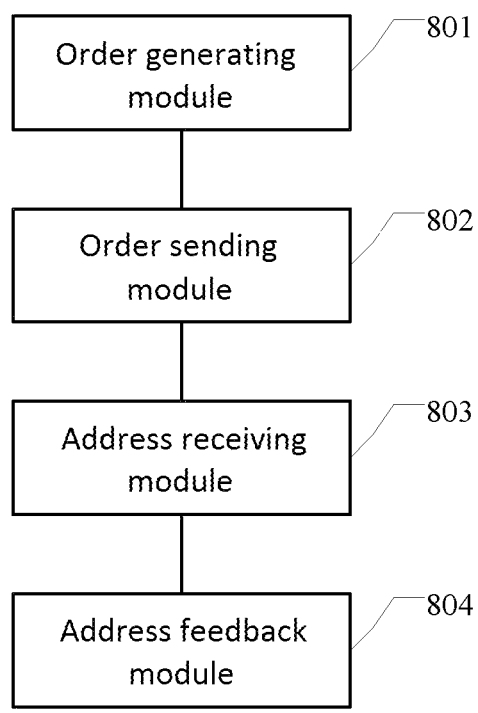
FIG. 10 shows a schematic structural diagram of a payment apparatus applied to the first server provided by an embodiment of the application.

An embodiment of the application provides a payment apparatus applied to a first server, as shown in FIG. 10. FIG. 10 shows a schematic structural diagram of a payment apparatus applied to the first server provided by an embodiment of the application. The payment apparatus applied to the first server may comprise:
- an order generating module 801 used to generate an order corresponding to order confirmation information sent by a terminal device.

Wherein, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions.
- an order sending module 802 used to send the order to the second server.

An address receiving module 803 used to receive the second address corresponding to the unified payment gateway sent by the second server.

An address feedback module 804 used to feed back the second address to the terminal device, so that the terminal device calls the payment component to pay for the order based on the page corresponding to the second address.

In an embodiment of the application, the address receiving module 803 is specifically used to:
receive the URL address sent by the second server; wherein, the URL address comprises the second address corresponding to the unified payment gateway.

In an embodiment of the application, the address feedback module 804 is specifically used to:
send page jump information to the terminal device; wherein, the page jump information comprises the second address corresponding to the unified payment gateway.

Figure 11:
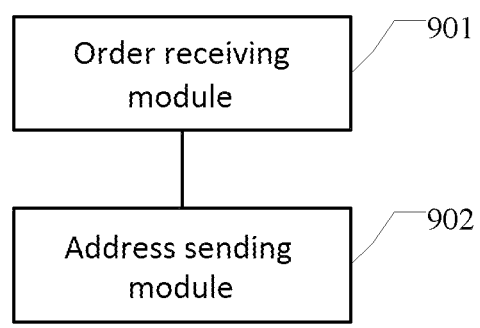
FIG. 11 shows a schematic structural diagram of a payment apparatus applied to the second server provided by an embodiment of the application.

An embodiment of the application provides a payment apparatus applied to a second server, as shown in FIG. 11. FIG. 11 shows a schematic structural diagram of a payment apparatus applied to the second server provided by an embodiment of the application. The payment apparatus applied to the second server may comprise:
- an order receiving module 901 used to receive an order sent by the first server.

Wherein, the order is an order corresponding to the order confirmation information sent by the terminal device to the first server, the order confirmation information is sent by the terminal device based on the first page corresponding to the first address, and the first address is the address obtained by the terminal device by identifying a target graphic identifier through the first app, the first app is one of multiple optional apps, and the optional apps comprise apps with payment functions and apps without payment functions.

An address sending module 902 used to send the second address corresponding to the unified payment gateway to the first server, so that the first server feeds back the second address to the terminal device, and the terminal device calls the payment tool to pay for the order based on the page corresponding to the second address.

In an embodiment of the application, the address sending module 902 is specifically used to:
send the URL address including the second address corresponding to the unified payment gateway to the first server.

In an embodiment of the application, the payment apparatus applied to the second server provided by the embodiment of the application further comprises:
an address generating module used to generate a URL address including the second address corresponding to the unified payment gateway.

In an embodiment of the application, the payment apparatus applied to the second server provided by the embodiment of the application further comprises:
a payment component configuration parameter sending module used to send the payment component configuration parameters to the terminal device so that the terminal device calls the payment component corresponding to the payment component configuration parameter to pay for an order.

In an embodiment of the application, the payment component configuration parameter is used to instruct to call the payment component that comes with the first app to pay for the order.

In an embodiment of the application, the payment component configuration parameter is used to instruct to call the payment component set by the second server by default to pay for the order.

In an embodiment of the application, the payment component configuration parameter is used to instruct to call the default payment component of the terminal device to pay for the order.

In an embodiment of the application, the payment component configuration parameters comprise configuration parameters corresponding to at least two payment components, so that the terminal device displays the options of the at least two payment components to the user, and calls the selected payment component to pay for the order.

Figure 12:
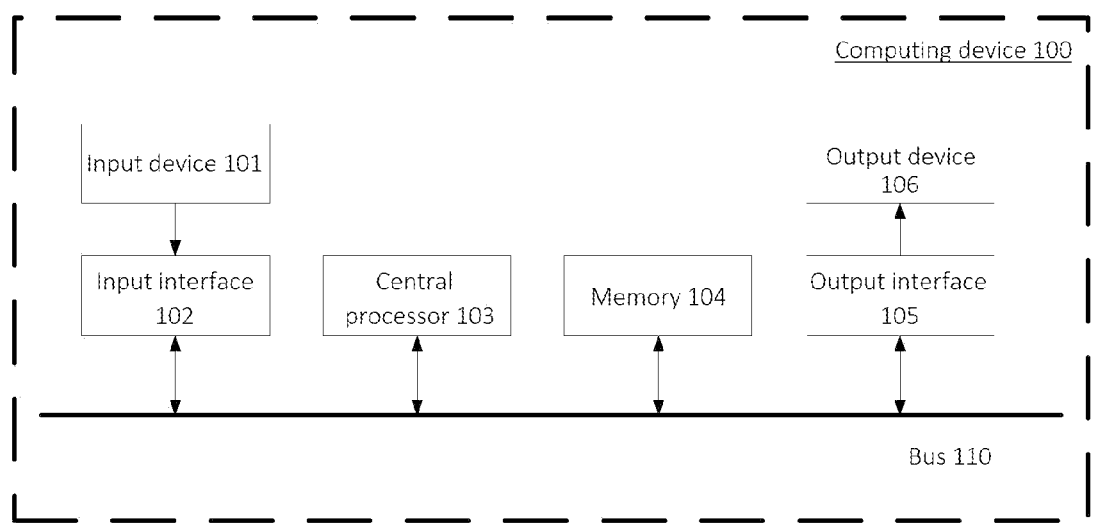
FIG. 12 shows a structural diagram of an exemplary hardware architecture of a computing device capable of implementing the payment method and apparatus according to the embodiments of the application.

FIG. 12 shows a structural diagram of an exemplary hardware architecture of a computing device capable of implementing the payment method and apparatus according to the embodiments of the application. As shown in FIG. 12, the computing device 100 comprises an input device 101, an input interface 102, a central processing unit 103, a memory 104, an output interface 105, and an output device 106. Wherein, the input interface 102, the central processing unit 103, the memory 104, and the output interface 105 are connected to each other through the bus 110, and the input device 101 and the output device 106 are connected to the bus 110 through the input interface 102 and the output interface 105, respectively, and then to the other components of the computing device 100.

Specifically, the input device 101 receives input information from the outside, and transmits the input information to the central processing unit 103 through the input interface 102; the central processing unit 103 processes the input information based on the computer executable instructions stored in the memory 104 to generate output Information, the output information is temporarily or permanently stored in the memory 104, and then the output information is transmitted to the output device 106 through the output interface 105; the output device 106 outputs the output information to the outside of the computing device 100 for the user to use.

In other words, the computing device shown in FIG. 12 can also be implemented as a payment device. The payment device can comprise: a memory storing computer-executable instructions; and a processor, and when the computer-executable instructions are executed by a processor, the processor is caused to implement the payment method and apparatus provided by the embodiment of the application.

The embodiment of the application also provides a computer-readable storage medium, the computer-readable storage medium stores computer program instructions; and when the computer program instructions are executed by a processor, the payment method provided by the embodiment of the application is implemented.

According to the payment method, apparatus, device, system, and storage medium of the embodiments of the application, the terminal device identifies a target graphic identifier through the first application app to obtain the first address, the first app is one of multiple optional apps, and the optional apps comprise apps with payment functions and apps without payment functions; sends order confirmation information to the first server based on the first page corresponding to the first address; the first server generates an order corresponding to the order confirmation information and sends the order to the second server; the second server receives the order sent by the first server and sends the second address corresponding to an unified payment gateway to the first server; the first server feeds back the second address to the terminal device; the terminal device calls a payment component to pay for the order based on the second page corresponding to the second address. The terminal device can complete payment by scanning codes using any app. In addition, the acquiring institution does not need to interface with different third-party payment tools, which can reduce interface cost and improve payment efficiency.

Although the application has been described with reference to the preferred embodiments, various modifications can be made to it and the components therein can be replaced with equivalents without departing from the scope of the application. In particular, as long as there is no structural conflict, the various technical features mentioned in the various embodiments can be combined in any manner. The application is not limited to the specific embodiments disclosed herein, but comprises all technical solutions falling within the scope of the claims.

What is claimed is:

1. A method for improving payment processing efficiency, the method comprising:

scanning, by a first application using a scanning device of a terminal device, graphical identifiers of a graphical code, wherein the terminal device comprises a processor, a memory, the scanning device, a browser application, the first application without payment functions, and a second application with payment functions;

automatically obtaining, by the first application, from the scanned graphical identifiers of the graphical code, a first uniform resource locator (URL) address corresponding to a first page associated with a merchant;

accessing, by the browser application, the first page associated with the merchant at the first URL address;

receiving, by the processor, order confirmation information from a user for an order with the merchant at the first page associated with the merchant accessed by the browser application;

sending, by the processor, the order confirmation information for the order with the merchant to a first server, configuring the first server to:
 generate the order corresponding to the order confirmation information sent by the processor,
 send the order corresponding to the order confirmation information sent by the processor to a second server,
 receive, from the second server, a second URL address corresponding to a second page associated with a unified payment gateway, and
 send, to the processor, the second URL address corresponding to the second page associated with the unified payment gateway;

receiving, by the processor, from the first server, the second URL address corresponding to the second page associated with the unified payment gateway;

accessing, by the browser application, the second page associated with the unified payment gateway at the second URL address received by the processor; and executing, by the processor, a payment component of the second application to pay for the order with the merchant via the unified payment gateway of the second page such that the first application is applied for scanning the graphical code and the second application is applied for paying the order, wherein executing the payment component of the second application to pay for the order further comprises:

receiving, by the processor from the second server, payment component configuration parameters, wherein the payment component configuration parameters sent by the second server comprise configuration parameters corresponding to at least two payment components that the second server is configured to interface with, including the payment component of the second application, displaying, by the processor, options of the at least two payment components corresponding to the payment component configuration parameters to pay for the order, receiving, by the processor, a selection by the user of the payment component of the second application of the at least two payment components after the at least two payment components corresponding to the payment component configuration parameters are displayed to the user, and executing, by the processor, a selected payment component based on the selection by the user to pay for the order, wherein the selected payment component is the payment component of the second application, wherein the second server does not interface with a third-party payment component not configured on the second server, and wherein the user can select among the at least two payment components to improve payment processing efficiency.

2. The method according to claim 1, wherein the first application comprises one of: a browser application, a camera application, a chat application, a video application, a news application, a hospital application, or a transportation application.

3. The method according to claim 1, wherein the payment component configuration parameters are used to execute the payment component set by the second server by default to pay for the order.

4. The method according to claim 1, wherein the payment component configuration parameters are used to execute a default payment component of a terminal device to pay for the order.

5. The method according to claim 1, wherein before sending order confirmation information to the first server based on the first page corresponding to the first URL address, the method further comprises:

verifying, by the processor, a legality of the first URL address.

6. The method according to claim 5, wherein verifying the legality of the first URL address comprises:

determining, by the processor, whether a domain name in the first URL address exists in a legal domain name database; and verifying, by the processor, the first URL address based on the first URL address existing in the legal domain name database.

7. The method according to claim 5, wherein verifying the legality of the first URL address comprises:

determining, by the processor, whether there is a specific character string in the first URL address; and verifying, by the processor, the first URL address based on the specific character string being in the first URL address.

8. The method according to claim 5, wherein verifying the legality of the first URL address comprises:

obtaining, by the processor, a signature result corresponding to a domain name in the first URL address;

decrypting, by the processor, the signature result to obtain a decryption result;

determining, by the processor, whether the domain name in the first URL address is the same as the decryption result; and verifying, by the processor, the first URL address based on the domain name in the first URL address being the same as the decryption result.

9. A terminal device for improving payment processing efficiency, the terminal device comprising:

a processor, a scanning device, a first application without payment functions, a second application with payment functions, a memory, and a computer program stored in the memory, wherein the computer program comprises an identification module, a browser module, an order confirmation information sending module, an address receiving module, and a payment module, and wherein when the computer program is executed by the processor:

the identification module is configured to:
scan, by the first application using the scanning device, graphical identifiers of a graphical code, and
automatically obtain, by the first application from the scanned graphical identifiers of the graphical code, a first uniform resource locator (URL) address corresponding to a first page associated with a merchant;

the browser module is configured to access the first page associated with the merchant at the first URL address;

the order confirmation information sending module is configured to:
receive order confirmation information from a user for an order with the merchant at the first page associated with the merchant accessed by the browser module, and
send the order confirmation information for the order with the merchant to a first server, configuring the first server to:
generate the order corresponding to the order confirmation information sent by the order confirmation information sending module,
send the order corresponding to the order confirmation information sent by the order confirmation information sending module to a second server,
receive, from the second server, a second URL address corresponding to a second page associated with a unified payment gateway, and
send, to the address receiving module, the second URL address corresponding to the second page associated with the unified payment gateway;

the address receiving module is configured to receive, from the first server, the second URL address corresponding to the second page associated with the unified payment gateway;

the browser module is further configured to access the second page associated with the unified payment gateway at the second URL address received by the address receiving module; and the payment module is configured to execute a payment component of the second application to pay for the order with the merchant via the unified payment gateway of the second page such that the first application is applied for scanning the graphical code and the second application is applied for paying the order, wherein executing the payment component of the second application to pay for the order further comprises:
  receiving, by the payment module from the second server, payment component configuration parameters, wherein the payment component configuration parameters sent by the second server comprise configuration parameters corresponding to at least two payment components that the second server is configured to interface with including the payment component of the second application,
  displaying, by the payment module, options of the at least two payment components corresponding to the payment component configuration parameters to pay for the order,
  receiving, by the payment module, a selection by the user of the payment component of the second application of the at least two payment components after the at least two payment components corresponding to the payment component configuration parameters are displayed to the user, and
  executing, by the payment module, a selected payment component based on the selection by the user to pay for the order, wherein the selected payment component is the payment component of the second application, wherein the second server does not interface with a third-party payment component not configured on the second server, and wherein the user can select among the at least two payment components to improve payment processing efficiency.

10. A terminal device for improving payment processing efficiency, the terminal device comprising:
  a processor, a scanning device, a first application without payment functions, a second application with payment functions, a browser application, a memory, and a computer program stored in the memory, and wherein when the computer program is executed by the processor, the processor is executing following steps:
    scanning, by a first application using the scanning device, graphical identifiers of a graphical code;
    automatically obtaining, by the first application from the scanned graphical identifiers of the graphical code, a first uniform resource locator (URL) address corresponding to a first page associated with a merchant;
    accessing, by the browser application, the first page associated with the merchant at the first URL address;
    receiving, by the processor, order confirmation information from a user for an order with the merchant at the first page associated with the merchant accessed by the browser application;
    sending, by the processor, the order confirmation information for the order with the merchant to a first server, configuring the first server to:
      generate the order corresponding to the order confirmation information sent by the processor,
      send the order corresponding to the order confirmation information sent by the processor to a second server,
      receive, from the second server, a second URL address corresponding to a second page associated with a unified payment gateway, and
      send, to the processor, the second URL address corresponding to the second page associated with the unified payment gateway;
    receiving, by the processor from the first server, the second URL address corresponding to the second page associated with the unified payment gateway;
    accessing, by the browser application, the second page associated with the unified payment gateway at the second URL address received by the processor; and
    executing, by the processor, a payment component of the second application to pay for the order with the merchant via the unified payment gateway of the second page such that the first application is applied for scanning the graphical code and the second application is applied for paying the order, wherein executing the payment component of the second application to pay for the order further comprises:
      receiving, by the processor from the second server, payment component configuration parameters, wherein the payment component configuration parameters sent by the second server comprise configuration parameters corresponding to at least two payment components that the second server is configured to interface with including the payment component of the second application,
      displaying, by the processor, options of the at least two payment components corresponding to the payment component configuration parameters to pay for the order,
      receiving, by the processor, a selection by the user of the payment component of the second application of the at least two payment components after the at least two payment components corresponding to the payment component configuration parameters are displayed to the user, and
      executing, by the processor, a selected payment component based on the selection by the user to pay for the order, wherein the selected payment component is the payment component of the second application, wherein the second server does not interface with a third-party payment component not configured on the second server, and wherein the user can select among the at least two payment components to improve payment processing efficiency.

11. A non-transitory computer-readable storage medium, wherein the computer-readable storage medium stores a computer program, and wherein when the computer program is executed by a processor, the processor executes following steps:
  scanning, by a first application using a scanning device of a terminal device, graphical identifiers of a graphical code, wherein the terminal device comprises a processor, a memory, the scanning device, a browser application, the first application without payment functions, and a second application with payment functions;
  automatically obtaining, by the first application from the scanned graphical identifiers of the graphical code, a first uniform resource locator (URL) address corresponding to a first page associated with a merchant;
  accessing, by the browser application, the first page associated with the merchant at the first URL address;
  receiving order confirmation information from a user for an order with the merchant at the first page associated with the merchant accessed by the browser application;
  sending the order confirmation information for the order with the merchant to a first server, configuring the first server to:
    generate the order corresponding to the order confirmation information sent by the processor, send the order corresponding to the order confirmation information sent by the processor to a second server,
receive, from the second server, a second URL address corresponding to a second page associated with a unified payment gateway, and
send, to the processor, the second URL address corresponding to the second page associated with the unified payment gateway;
receiving, from the first server, the second URL address corresponding to the second page associated with the unified payment gateway;
accessing, by the browser application, the second page associated with the unified payment gateway at the second URL address received by the processor; and
executing a payment component of the second application to pay for the order with the merchant via the unified payment gateway of the second page such that the first application is applied for scanning the graphical code and the second application is applied for paying the order, wherein executing the payment component of the second application to pay for the order further comprises:
receiving, by the processor from the second server, payment component configuration parameters, wherein the payment component configuration parameters sent by the second server comprise configuration parameters corresponding to at least two payment components that the second server is configured to interface with including the payment component of the second application,
displaying, by the processor, options of the at least two payment components corresponding to the payment component configuration parameters to pay for the order,
receiving, by the processor, a selection by the user of the payment component of the second application of the at least two payment components after the at least two payment components corresponding to the payment component configuration parameters are displayed to the user, and
executing, by the processor, a selected payment component based on the selection by the user to pay for the order, wherein the selected payment component is the payment component of the second application, wherein the second server does not interface with a third-party payment component not configured on the second server, and wherein the user can select among the at least two payment components to improve payment processing efficiency.

12. A payment system for improving payment processing efficiency, the system comprising:
a terminal device, wherein the terminal device comprises a processor, a scanning device, a memory, a browser application, the first application without payment functions, and a second application with payment functions, and wherein the terminal device is configured to:
scan, by the first application using the scanning device, the graphical identifiers of the graphical code;
automatically obtain, by the processor from the scanned graphical identifiers of the graphical code, a first uniform resource locator (URL) address corresponding to a first page associated with a merchant;
access, by the browser application, the first page associated with the merchant at the first URL address;
receive, by the processor, order confirmation information from a user for an order with the merchant at the first page associated with the merchant accessed by the browser application; and
send, by the processor, the order confirmation information for the order with the merchant to a first server;
the first server, wherein the first server is configured to:
receive, from the terminal device, the order confirmation information for the order with a merchant,
generate the order corresponding to the order confirmation information sent by the terminal device,
send the order corresponding to the order confirmation information sent by the terminal device to a second server,
receive, from the second server, a second URL address corresponding to a second page associated with a unified payment gateway, and
send, to the terminal device, the second URL address corresponding to the second page associated with the unified payment gateway;
the second server, wherein the second server is configured to:
receive, from the first server, the order, and
send, to the first server, the second address, configuring the first server to send the second address to the terminal device; and
the terminal device, wherein the terminal device is further configured to:
receive, by the processor, from the first server, the second URL address corresponding to the second page associated with the unified payment gateway;
access, by the browser application, the second page associated with the unified payment gateway at the second URL address received by the processor; and
execute, by the processor, a payment component of the second application to pay for the order with the merchant via the unified payment gateway of the second page such that the first application is applied for scanning the graphical code and the second application is applied for paying the order, wherein executing the payment component of the second application to pay for the order further comprises:
receive from the second server payment component configuration parameters, wherein the payment component configuration parameters sent by the second server comprise configuration parameters corresponding to at least two payment components that the second server is configured to interface with including the payment component of the second application,
display options of the at least two payment components corresponding to the payment component configuration parameters to pay for the order,
receive a selection by the user of the payment component of the second application of the at least two payment components after the at least two payment components corresponding to the payment component configuration parameters are displayed to the user, and
execute a selected payment component based on the selection by the user to pay for the order, wherein the selected payment component is the payment component of the second application, wherein the second server does not interface with a third-party payment component not configured on the second server, and wherein the user can select among the at least two payment components to improve payment processing efficiency.

\* \* \* \* \*